United States Patent
Hashimoto et al.

(10) Patent No.: US 6,916,264 B2
(45) Date of Patent: Jul. 12, 2005

(54) TENSIONER HAVING PROTRUSION-PREVENTING MECHANISM FOR A PLUNGER

(75) Inventors: Hiroshi Hashimoto, Osaka (JP); Atsushi Kumakura, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 243 days.

(21) Appl. No.: 10/319,120

(22) Filed: Dec. 13, 2002

(65) Prior Publication Data

US 2003/0125142 A1 Jul. 3, 2003

(30) Foreign Application Priority Data

Dec. 28, 2001 (JP) .................................... 2001-402050

(51) Int. Cl.[7] .............................................. F16H 7/08
(52) U.S. Cl. ...................... 474/109; 474/110; 474/111
(58) Field of Search ............................... 474/109, 110, 474/111

(56) References Cited

U.S. PATENT DOCUMENTS

| | | | |
|---|---|---|---|
| 5,601,505 A | 2/1997 | Tada | |
| 5,713,809 A | 2/1998 | Yamamoto et al. | |
| 6,435,992 B2 * | 8/2002 | Wakabayashi et al. | 474/101 |
| 2003/0017893 A1 * | 1/2003 | Kaido et al. | 474/101 |

FOREIGN PATENT DOCUMENTS

| | | |
|---|---|---|
| GB | 2 356 911 A | 6/2001 |
| JP | 58-38189 | 8/1983 |
| JP | 60-56847 | 4/1985 |
| JP | 7-317854 | 12/1995 |
| JP | 08-152051 | 6/1996 |
| JP | 11210844 A | 8/1999 |

* cited by examiner

*Primary Examiner*—David A. Bucci
*Assistant Examiner*—Bradley J. Van Pelt
(74) *Attorney, Agent, or Firm*—Howson and Howson

(57) ABSTRACT

In a tensioner for a timing belt or chain in an engine, a plunger, which is spring-biased in a protruding direction, is temporarily held in a retracted condition by a pivoted U-shaped or L-shaped wire spring. The spring has a locking portion engageable with a pin or groove on the plunger, and two arms having ends remote from the locking portion. The ends are pivoted to the housing on laterally displaced pivot axes. The lateral displacement of the pivot axes causes the wire spring to be under stress when its locking portion is engaged with the plunger, and the stress urges the locking portion toward a disengaged position. Thus, the plunger is held in its retracted condition during assembly by the locking portion of the wire spring, but is automatically released by disengagement of the locking portion from the plunger when the plunger is moved farther in the retracting direction.

15 Claims, 12 Drawing Sheets

TENSIONER HAVING PROTRUSION-PREVENTING MECHANISM FOR A PLUNGER

FIELD OF THE INVENTION

This invention relates to a tensioners of the kind utilized to maintain tension in a belt or chain in a power transmission mechanism such as a valve timing transmission in an internal combustion engine. It relates more particularly to a tensioner having a plunger, and in which, when the plunger retracts, a locking member for temporarily preventing protrusion of the plunger is automatically disengaged from the plunger.

BACKGROUND OF THE INVENTION

When power is transmitted from the crankshaft to a camshaft of an engine by a timing belt or chain, tension is maintained in the belt or chain by a tensioner which comprises a tensioner housing, and a plunger protruding from the housing and spring-biased in the protruding direction. In the process of assembly of the timing transmission of an engine, it is necessary for the plunger to be pushed into the housing prior to installation of the tensioner. Accordingly, tensioners having a protrusion-preventing mechanisms have been proposed. Two such mechanisms are described respectively in Japanese Laid-open Utility Model Publication No. Sho. 56-170347 and Laid-open Patent Publication No. Hei. 7-317854.

FIGS. 27 to 29 show a tensioner 1 having a conventional hook-type, protrusion-preventing mechanism. FIG. 27 is a side elevation showing the hook in the locked condition. FIG. 28 is a side elevation showing the hook in the unlatched condition. FIG. 29 is a front elevation of the tensioner shown in FIG. 27.

The tensioner 1 is attached to an engine by bolts (not shown) inserted through bolt holes 2b (FIG. 29) in a mounting flange 2a provided at the rear end of a tensioner housing 2. A plunger 3, projecting outward from the housing 2, is provided with a toothed rack 3a extending axially on its outer surface. The plunger is slidable in a cylindrical bore in the housing and urged in the protruding direction by a spring (not shown) located inside the bore. A pawl 5 is engageable with the rack 3a to prevent backward movement of the plunger as a result of the force imparted to the plunger by a chain through a chain-engaging tensioning lever (not shown). The tensioner includes a locking pin 4 protruding laterally from the plunger near the front end thereof, and a hook 9, pivoted to the housing 2 on a shaft 8. A notch 9a on the hook is engageable with the locking pin 4, and is formed with an oblique surface 9b, shaped so that a slight movement of the plunger 3 in the retracting direction will effect release of the hook 9 from pin 4. Thus, when the plunger 3 is first moved in the retracting direction by the force exerted by a chain through a tensioner lever, the hook 9 is disengaged from the locking pin 4, and pivots away from the locking pin by gravity.

A problem with the tensioner shown in FIGS. 27–29 is that the unlocking of the hook is dependent on gravity, and consequently the tensioner must be positioned so that the hook swings downward about its pivot axis in order disengage, and remain disengaged from, the locking pin 4.

FIGS. 30 and 31 show a tensioner 11, having another conventional protrusion-preventing mechanism utilizing a hook, FIG. 30 being a plan view and FIG. 31 being a side elevation. Both show the hook in the latched condition.

A plunger 13 is slidable in a cylindrical bore in a housing 12, and biased in the protruding direction by a spring (not shown) provided inside the housing. The locking mechanism comprises a locking pin 14 fixed to the plunger 13, a hook 19 pivotally mounted on the housing 12, and engageable with the locking pin 14. A coiled torsion spring 20 biases the hook 19 toward its unlatched position so that the hook will automatically and permanently disengage from the pin 14 when the plunger is first pushed inward.

The tensioner of FIGS. 30 and 31 is not gravity-dependent, and therefore can be mounted in any attitude. However, it requires an additional part, namely, the coiled torsion spring, and is structurally more complex than the tensioner of FIGS. 27–29 and more difficult to assemble. Moreover, it requires space for assembly of the coiled torsion spring.

Accordingly, objects of the invention are to solve the above-mentioned problems encountered in the assembly and use of conventional protrusion-preventing mechanisms, and to provide a tensioner in which the plunger can be automatically unlocked by a simple, easily assembled, and reliable mechanism.

A preferred tensioner in accordance with the invention comprises a housing and a plunger protruding from the housing. The plunger is movable between a retracted position and a protruding condition and is biased in the protruding direction, preferably by a spring inside the housing. The plunger is temporarily maintained in its retracted position by a locking member comprising a wire spring, which has a locking portion engageable with the plunger when the plunger is in its retracted position. The wire spring, also has two arms extending from the locking portion, the respective arms having front ends pivotally attached to the housing, so that the wire spring is pivotable on the housing from a position in which the locking portion is engaged with the plunger to a position in which the locking portion is disengaged from the plunger. The front ends of the arms are pivoted on axes which are laterally displaced with respect to each other in a direction such that a stress is generated in the wire spring when its locking portion is engaged with the plunger. This stress resiliently urges the wire spring in a direction to disengage the locking portion from the plunger.

The plunger is provided with a detent, preferably in the form of a pin or a groove, having an engagement surface positioned to hold the locking portion in engagement with the plunger when the plunger is in its retracted position, and to allow the locking portion to clear the detent when the plunger is moved farther in a retracting direction from said retracted position, thereby allowing the stress in the wire spring to cause the locking portion to clear the detent.

The wire spring is preferably substantially U-shaped, in which case the front ends of its arms are connected to opposite side walls of the tensioner housing, or substantially L-shaped, in which case the front ends of both arms are connected to the same side of the tensioner housing.

The wire spring always tends to move in a direction such that its stress will decrease. Therefore, when a plunger is moved from its locked position farther in the retracting direction as a result of a pressing force exerted by a chain or belt to which tension is to be applied, the wire spring is released and rotates in the direction in which its stress is decreased, thereby automatically disengaging the plunger.

DETAILED DESCRIPTION OF THE PREFERRED EMBODIMENTS

Figure 1:
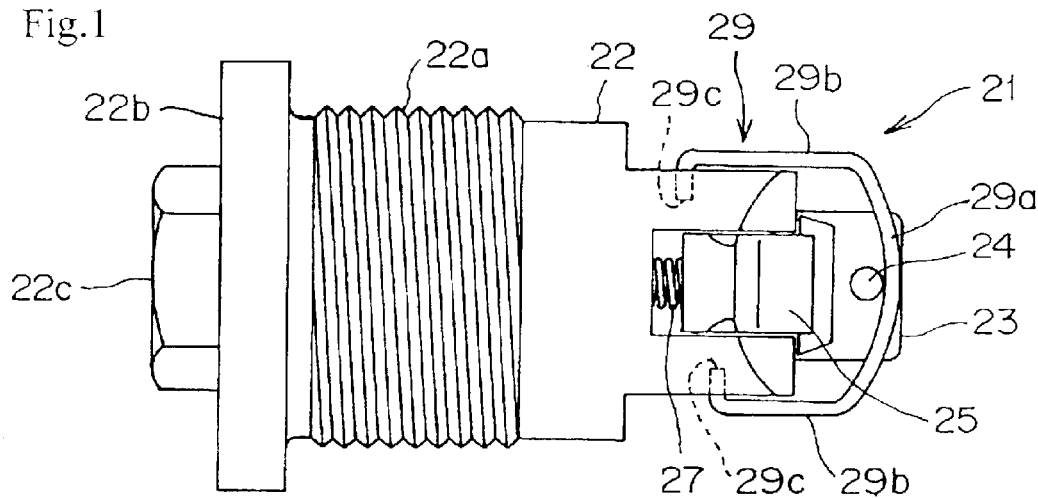
FIG. 1 is a top plan view showing a tensioner according to a first embodiment of the invention, with its wire spring in a locked condition.

A tensioner according to the first embodiment of the invention will be described with reference to FIGS. 1 to 6(B).

The tensioner shown in FIGS. 1 to 5 a plunger 23 slidable axially in a cylindrical bore (not shown) provided in a housing 22. The front end of the plunger 23 protrudes from the housing to the outside. Although not shown, a coil spring is provided inside the cylinder for biasing the plunger 23 in the protruding direction. A male thread 22a is formed On an outer circumferential surface of the housing 22 for mounting the tensioner on an engine, and a mounting flange 22b and a head 22c, for engagement by a wrench or other suitable tool, are provided on the rear end of the housing 22.

An anti-backing mechanism is provided on the tensioner, allowing protruding movement of the plunger 23 but blocking retracting movement of the plunger 23. The anti-backing mechanism comprises a toothed rack 23s (FIG. 5) formed on the plunger 23, a pawl 25, pivotally supported on the housing 22 by a shaft 26, and a compression spring 27, biasing the pawl 25 into engagement with the rack. When the plunger 23 is moved in the protruding direction, the pawl 25 is pivoted, compressing the spring 27 so that the engagement between the pawl 25 and the rack 23a is released. However, the engagement of the pawl with the rack prevents retracting movement of the plunger.

A wire spring 29, pivoted on side walls of the housing 22, is provided in order to serve as a locking member for temporarily securing the plunger in its retracted condition to facilitate installation of the tensioner in an engine.

Figure 2:
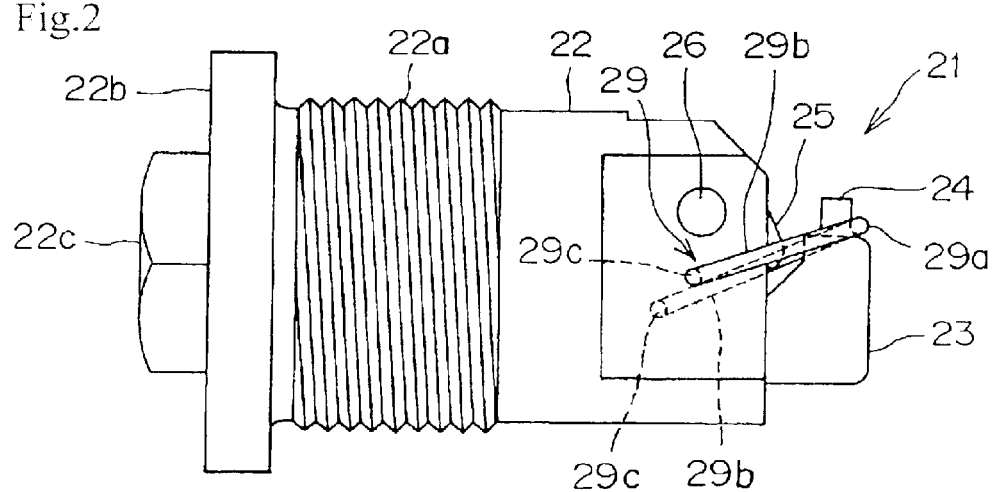
FIG. 2 is a side elevational view of the tensioner of FIG. 1.
Figure 3:
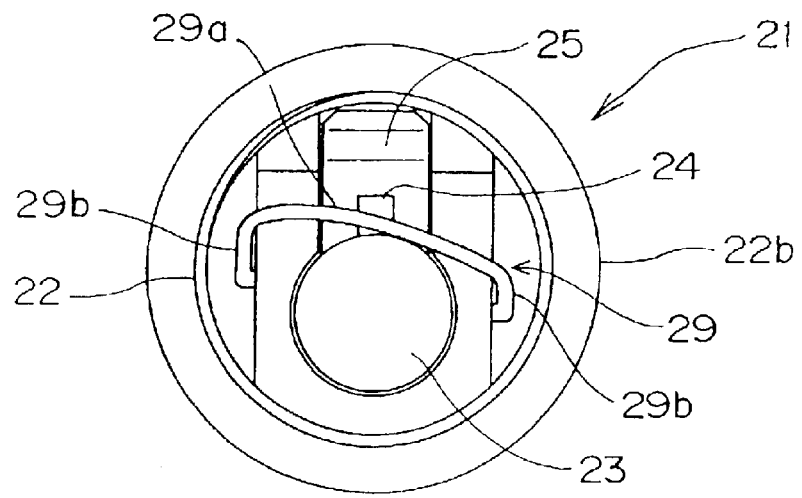
FIG. 3 is a front view of the tensioner of FIGS. 1 and 2, as seen from the right side of FIG. 2.
Figure 4:
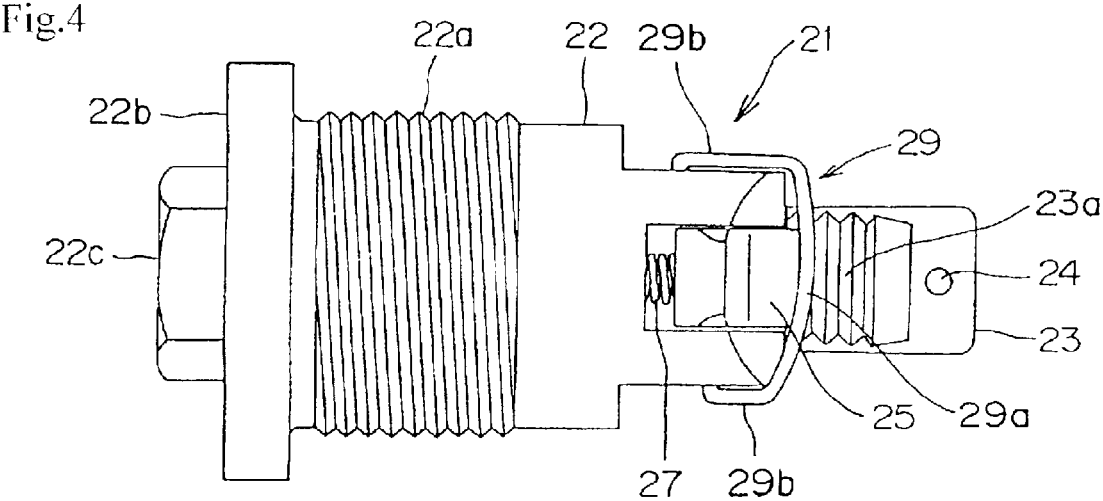
FIG. 4 is a top plan view the tensioner of FIGS. 1–3 with its wire spring in an unlatched position, and its plunger in a protruding condition.

The wire spring 29 comprises a locking portion 29a, which, as shown in FIGS. 1–3, is engaged with a locking pin 24 projecting from the plunger in a direction transverse to the axis along which the plunger moves. The wire spring also has two arms 29b, which are continuous with the locking portion 29a as shown in FIGS. 6(A) and 6(B). The lengths of the two arms 29b are different from each other, and the end portion 29c of each arm 29b is bent inward. When the wire spring is in a relaxed condition, the two arms 29b are in a common plane as seen in FIG. 6(A). The wire spring 29 is substantially U-shaped as shown in FIG. 6(B).

Figure 5:
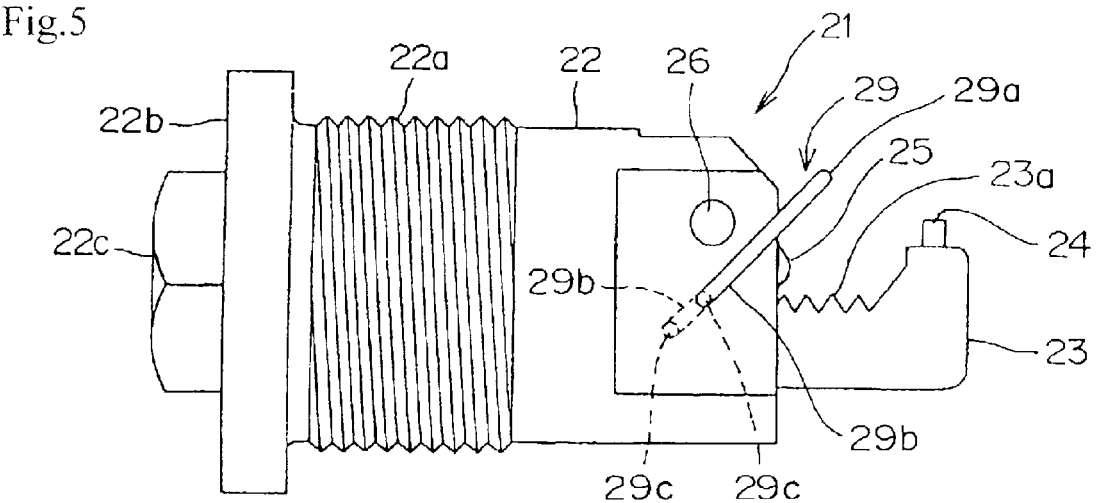
FIG. 5 is a side elevational view of the tensioner of FIG. 4.
Figure 6:
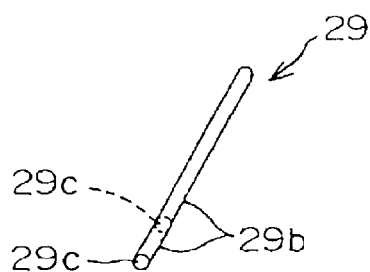
FIG. 6(A) is a side elevational view of the wire spring of FIGS. 1–5 in its relaxed condition.
FIG. 6(B) is a front elevational view of the wire spring of FIG. 6(A)
Figure 6:
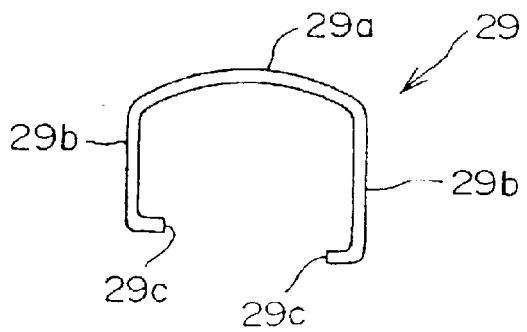

The wire spring 29 is attached to mounting holes formed on the side walls of the housing 22. The mounting holes are not aligned with each other, but instead are disposed at shifted positions so that the arms pivot on axes that are laterally displaced with respect to each other. The ends of the respective arms 29b are pivotable as shown in FIG. 5. As shown in FIG. 5, the wire spring 29 is attached to the housing 22 in the same relaxed condition as depicted in FIG. 6(A). Therefore, when the plunger is released, as shown in FIG. 5., the wire spring 29 is in an unstressed condition.

When the wire spring 29 is pivoted clockwise from its unlatched condition as shown in FIG. 5, to engage its locking portion 29a with pin 24 as shown in FIG. 2, a stress is generated in the wire spring. The reason for the generation of the stress is as follows. Since the pivot axes of the respective arms 29b of the wire spring 29, that is the positions of the end portions 29c, are displaced from each other, the pivoting paths of the opposite ends of the arms 29b are different from each other. Consequently strain is produced in the locking portion 29a, resulting in the generation of stress in the wire spring.

Figure 26:
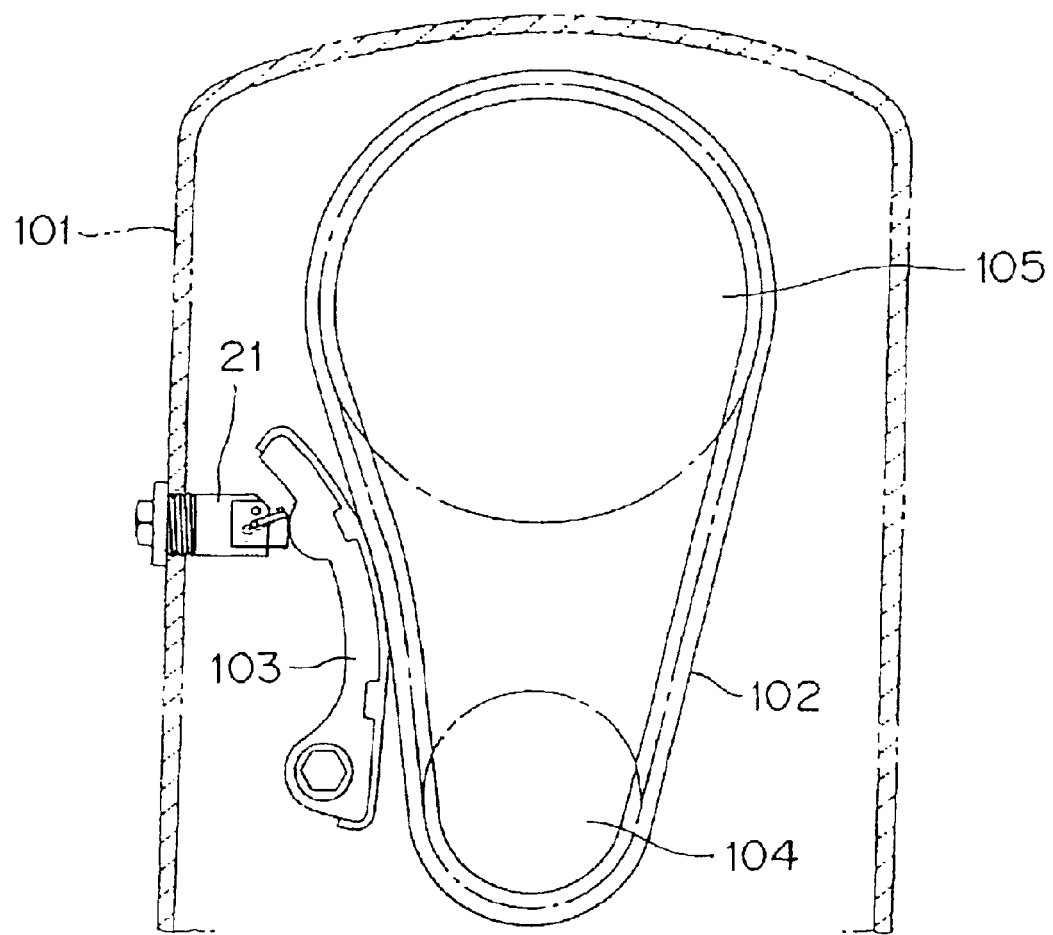
FIG. 26 is a schematic front elevational view showing a tensioner according to the first embodiment of the invention incorporated into the valve timing transmission of an internal combustion.
Figure 27:
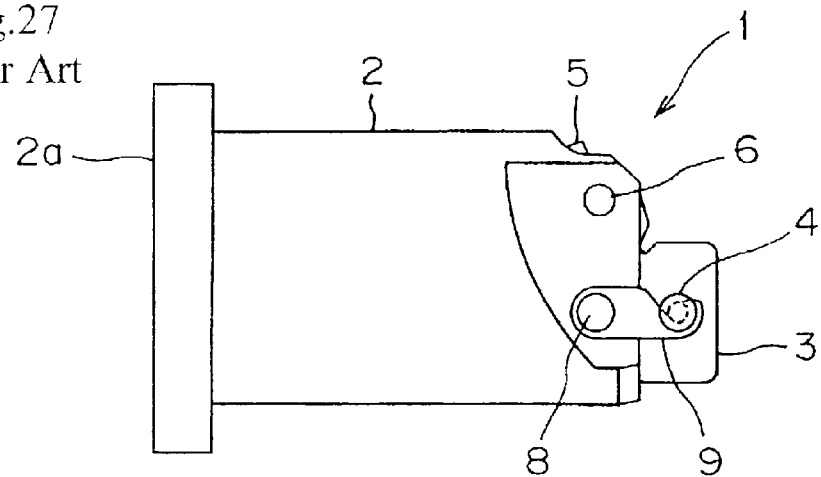
FIG. 27 is a front elevational view showing a conventional tensioner utilizing a gravity dependent hook as a protrusion-preventing mechanism.
Figure 28:
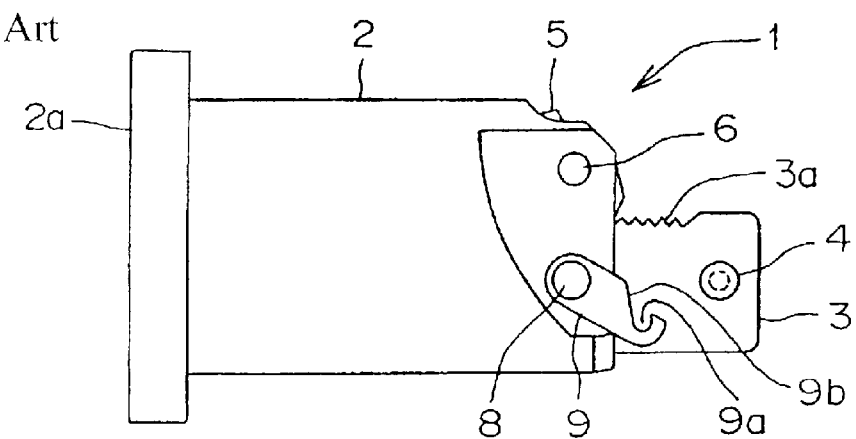
FIG. 28 is a front view of the tensioner of FIG. 27, showing the hook in its unlatched condition and showing the plunger in its protruding condition.
Figure 29:
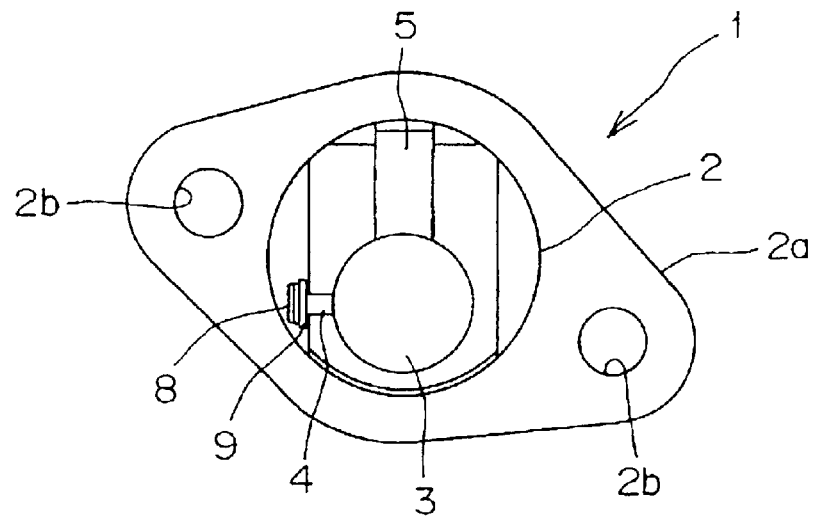
FIG. 29 is a front elevational view of the tensioner of FIG. 27 as seen from the right side of FIG. 27.

As shown in FIG. 26, in a typical application, the tensioner 21 is incorporated into a housing 101, which encloses the timing transmission of an engine. Alternatively, the tensioner may be mounted on the engine block, on the cylinder head, or on another part of an engine or other machine. An endless chain 102, in the form of a loop, is in mesh with a crank sprocket 104 and a cam sprocket 105, and transmits the rotation of the crank sprocket 104 to the cam sprocket 105. A pivoted lever 103 is provided for engagement with the slack side of the chain 102.

Before the tensioner 21 is installed on the engine, the pawl 25 is disengaged from the rack 23a, and plunger 23 is pushed inward into the housing of the tensioner against the biasing force of the coil spring inside the housing. As shown in FIG. 2, while the plunger is held in its retracted condition, the wire spring 29 is pivoted clockwise so that a stress is generated in the wire spring as described above. The locking portion 29a of the wire spring 29 is engaged with the locking pin 24. The wire spring prevents protrusion of the plunger, and at the same time, the engagement of the locking pin 24 with the locking portion 29a of the wire spring 29, under the biasing force exerted on the plunger by the spring (not shown) inside the housing, holds the locking portion of the spring in engagement with the locking pin 24.

While the wire spring 29 is engaged with the locking pin 24 so that the protrusion of the plunger 23 is prevented, the tensioner is incorporated into the engine, as shown in FTG. 26, by engaging the male thread 22a on the outer surface of the housing 22 with a mating thread in the timing chain housing or in another engine component.

When the tensioner 21 is incorporated into the engine, the front end of the plunger 23 abuts a lever 103, which, in turn, engages the chain 102. As the engine starts, the chain pushes on the lever, and the lever pushes the plunger 23 slightly in the retracting direction. This allows, the wire spring 29 to disengage from the locking pin 24, whereupon the wire spring automatically rotates in a direction such that its stress decreases, thereby clearing the locking pin and allowing the plunger to move in the protruding direction under the biasing force exerted by the internal spring within the tensioner housing. As a result, the front end of the plunger 23 pushes the lever 103, which in turn pushes on the chain 102, thereby applying appropriate tension to the chain. The wire spring 29 tends to remain in a stable condition in which its stress is at the lowest possible level. Consequently the wire spring is held in a condition where the wire spring 29 is disengaged from the locking pin 24.

Figure 30:
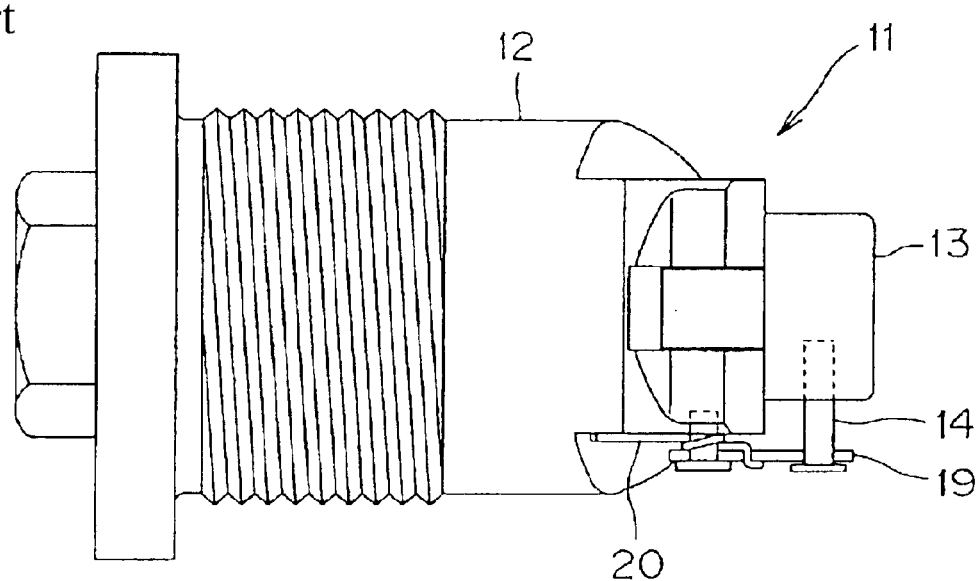
FIG. 30 is a top plan view showing another conventional tensioner utilizing a hook biased toward its unlatched position by a coiled torsion spring.
Figure 31:
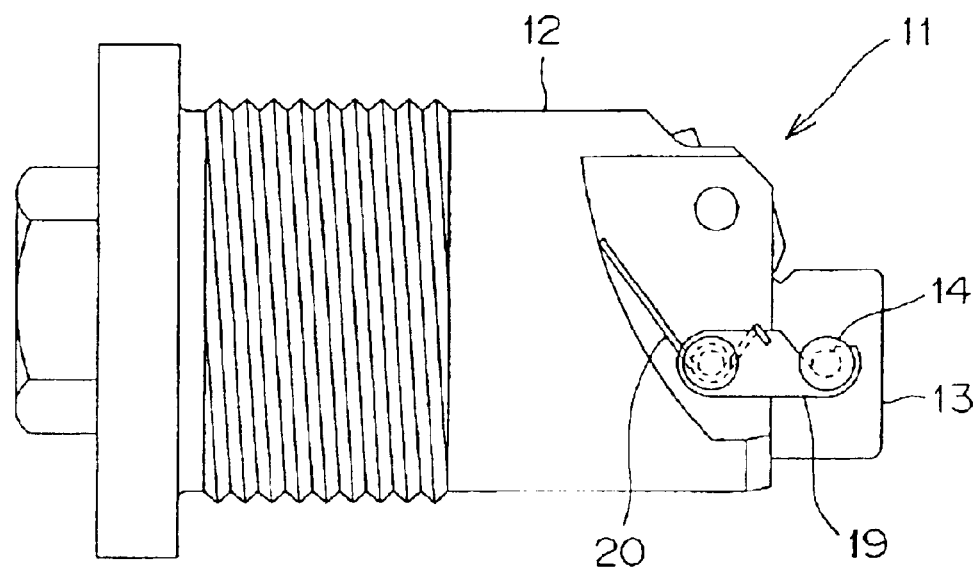
FIG. 31 is side elevational view of the tensioner of FIG. 30, showing the hook in its locked condition.

In this first embodiment of the invention, the wire spring 29 itself exerts the force needed to rotate it in an unlocking direction, and consequently the plunger is automatically and positively unlatched without the need for a coiled torsion spring in combination with a hook, as in the conventional tensioner depicted in FIGS. 30 and 31. Thus, the tensioner 21 requires fewer parts, and its components are more easily assembled. Additionally, since the wire spring 29 can be mounted on the housing 22 without a supporting shaft, the operation of press-fitting the supporting shaft into the housing is unnecessary. Accordingly, assembly of the tensioner 21 is facilitated.

Tensioners according to the second through sixth embodiments of the invention will now be described. When these embodiments are compared with the tensioner according to the first embodiment described above, the only difference is the manner in which the wire spring is mounted on the tensioner. The other components are the same as those shown in FIGS. 1–5. Thus, like components are designated by the same reference numbers, and duplicate descriptions are omitted.

In the second embodiment of the invention, shown in FIGS. 7–9(B), wire spring 39 comprises a locking portion 39a, which is engaged with a locking pin 24, and two arms 39b which are continuous with the locking portion 39a. The lengths of the two arms 39b are different from each other, and the end 39c of each arm 39b is bent inward. Although the wire spring 38 is U-shaped when viewed from the front as in FIG. 9, the arms 39b of the wire spring are also initially deformed so that, when the wire spring 39 is in its relaxed condition, the two arms 39b are in different planes as shown in FIG. 9(A).

Figure 7:
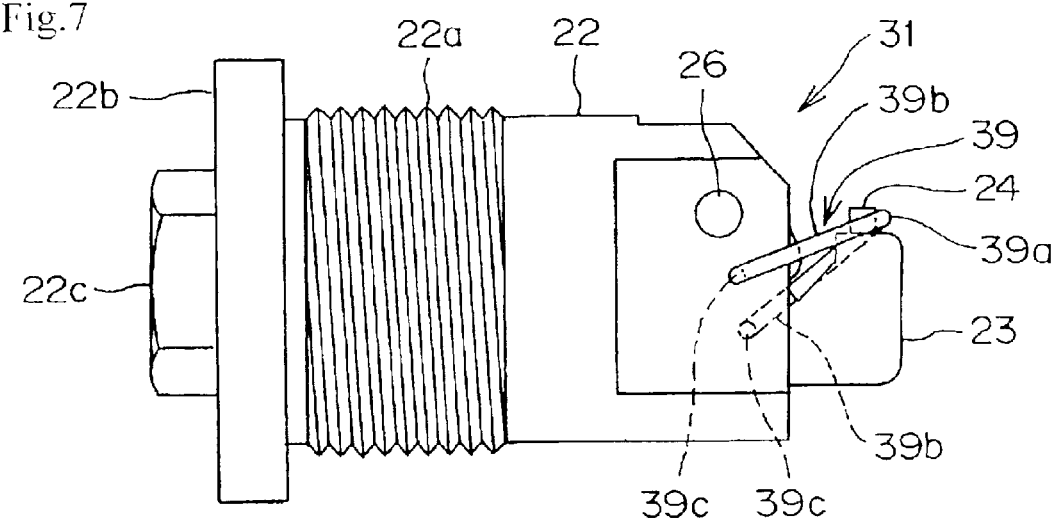
FIG. 7 is a side elevational view of a tensioner according to a second embodiment of the invention, with its wire spring in a locked condition.
Figure 8:
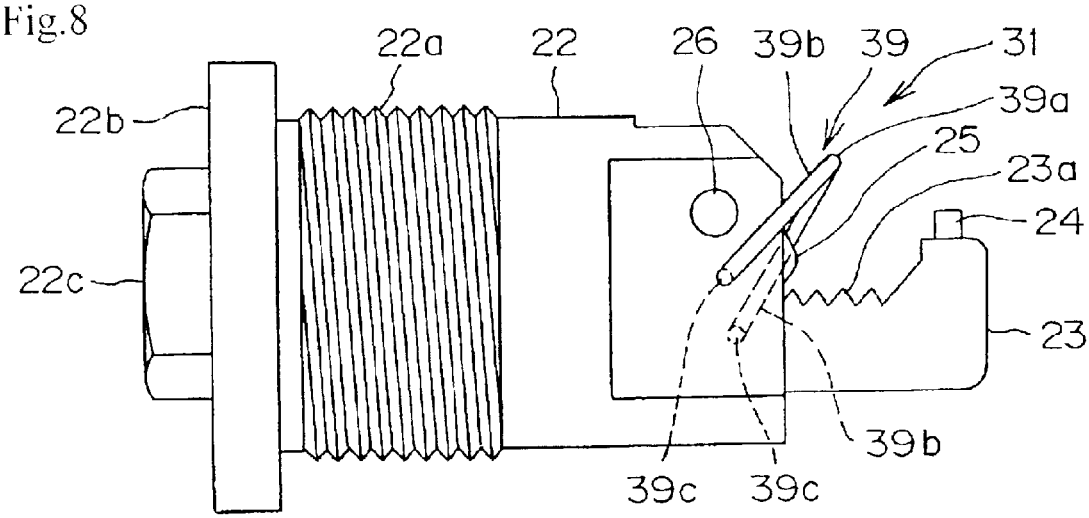
FIG. 8 is a side elevational view of the tensioner of FIG. 7, showing its wire spring in an unlatched condition and its plunger in a protruding condition.
Figure 9:
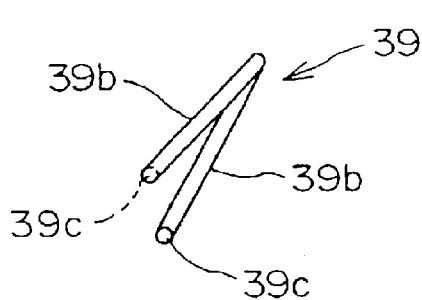
FIG. 9(A) is a side elevational view of the wire spring of FIGS. 7 and 8 in its relaxed condition.
FIG. 9(B) is a front elevational view of the wire spring of FIG. 9(A)
Figure 9:
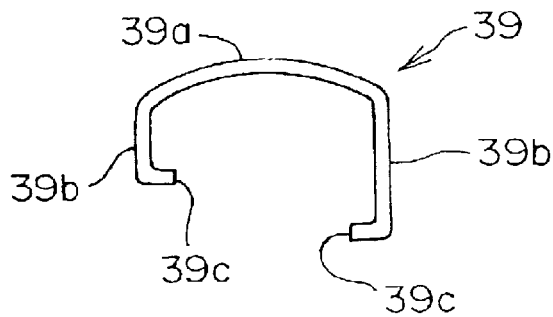

The wire spring 39 is attached to mounting holes formed on the both side walls of the housing 22 at displaced positions in such a manner that the ends of the respective arms 39b are pivotable about parallel, but laterally displaced axes, as shown in FIGS. 7 and 8. As shown in FIG. 8, the wire spring 39 is in the same form as in the relaxed condition shown in FIG. 9(A). Therefore, the wire spring 39 is unstressed in the unlatched condition shown in FIG. 8.

When the wire spring 39 is pivoted clockwise from the unlatched condition shown in FIG. 8, in order for the locking portion 39a to engage the locking pin 24, as shown in FIG. 7, stress is generated in the wire spring. The reason for the generation of the stress is as follows. Since the pivot centers of the respective arms 39b of the wire spring 39 are displaced, the paths of ends of the arms 39b that connect to the locking portion 39a are different, and consequently strain is produced in the locking portion 39a, and stress is generated by the strain.

The installation of the tensioner 31 of the second embodiment on an engine, and the operation and effects of the of the tensioner, are the same as in the case of the tensioner of the first embodiment.

A tensioner according to a third embodiment of the invention is shown in FIGS. 10 through 12(B).

Figure 10:
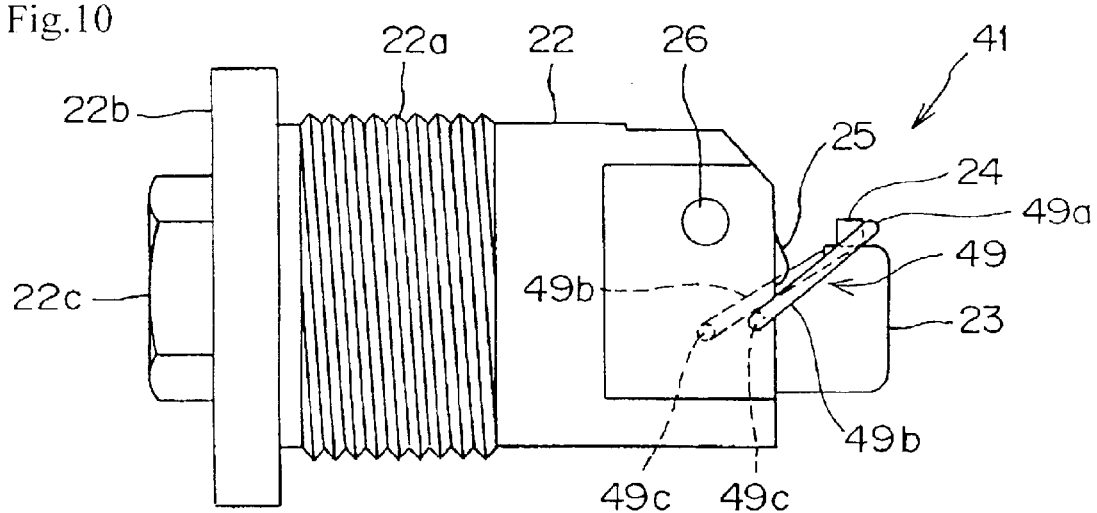
FIG. 10 is a side elevational view of a tensioner according to a third embodiment of the invention, with its wire spring in a locked condition.
Figure 11:
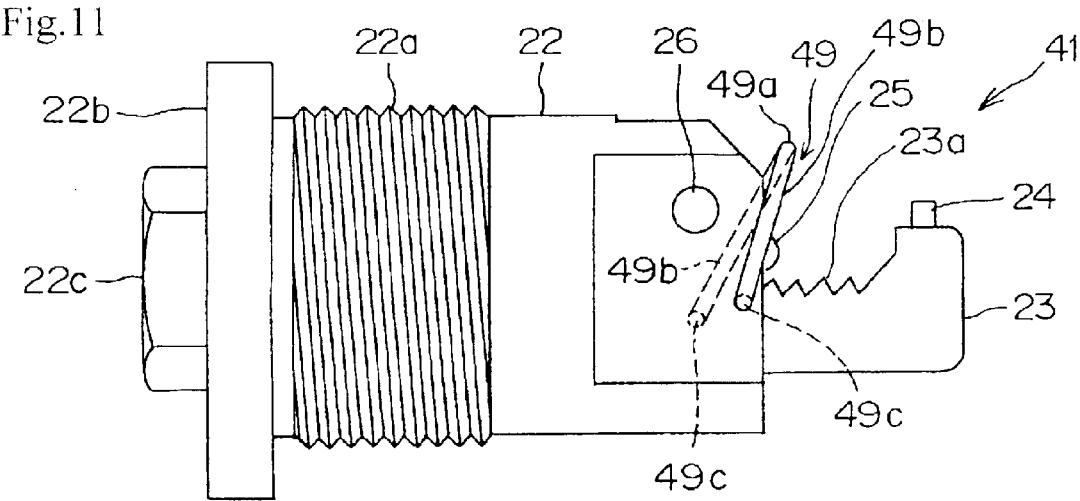
FIG. 11 is a side elevational view of the tensioner of FIG. 10, showing its wire spring in an unlatched condition and its plunger in a protruding condition.
Figure 12:
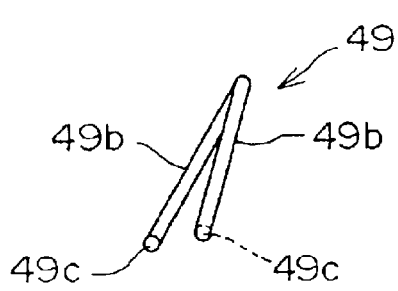
FIG. 12(A) is a side elevational view of the wire spring of FIGS. 10 and 11 in its relaxed condition.
FIG. 12(B) is a front elevational view of the wire spring of FIG. 12(A)
Figure 12:
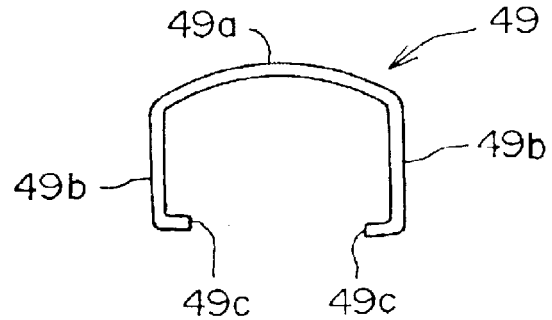

The wire spring 49 used in the tensioner 41 shown in FIGS. 10 and 11 comprises a locking portion 49a, which is engaged with a locking pin 24. Arms 49b are continuous with the locking portion 49a as shown in FIGS. 12(A) and 12(B). The lengths of the two arms 49b are different from each other, and the end portion 49c of each arm is bent inward. In the relaxed condition of the wire spring 49, the two arms 49b deformed so that they lie in different planes, as shown in FIG. 12(A). The wire spring 49 is substantially U-shaped as shown in FIG. 12(B).

The wire spring 49 is attached to mounting holes, formed on both side walls of the housing 22 at displaced positions, in such a manner that the ends of the respective arms 49b are pivotable as shown in FIG. 11. As shown in FIG. 11, the wire spring 49 is attached to the housing 22 in the same relaxed condition shown in FIG. 12(A). Therefore, the wire spring 49 pivots into an unstressed condition when disengaged from the locking pin on the plunger, as shown in FIG. 11.

When the wire spring 49 is pivoted clockwise from its unlatched condition as shown in FIG. 11 to engage the locking pin 24 as shown in FIG. 10, stress is generated in the wire spring. The reason for the generation of the stress is the same as in the case of FIGS. 7–9(B). The displacement of the pivot centers causes the paths of the ends of the arms 49b that connect to the locking portion 49a to be different, and consequently strain is produced in the locking portion 49a, and stress is generated by the strain.

The installation of the tensioner 41 in an engine, and its operation and effects are the same as in the case of the tensioner 21 of the first embodiment.

A tensioner according to a fourth embodiment of the invention is shown in FIGS. 13 to 15(B).

Figure 13:
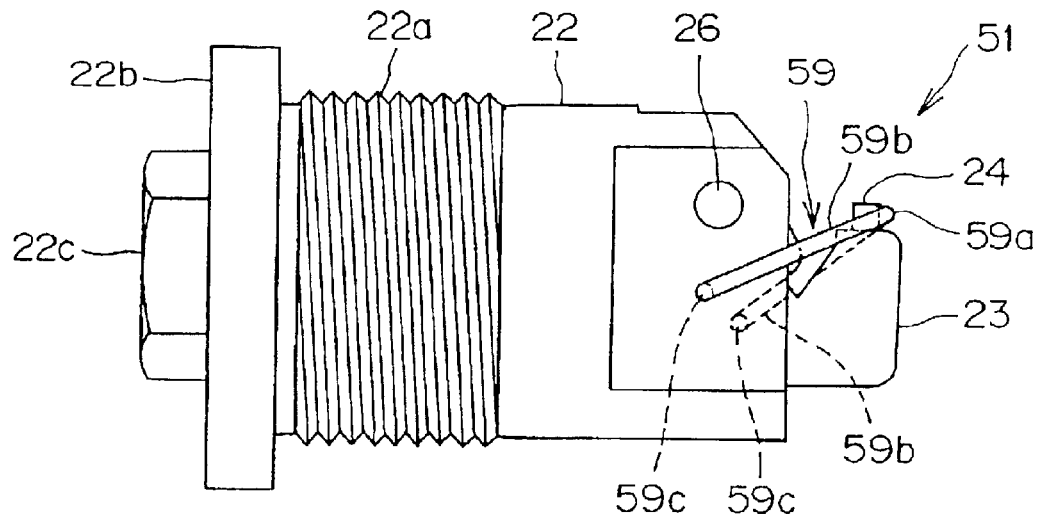
FIG. 13 is a side elevational view of a tensioner according to a fourth embodiment of the invention, with its wire spring in a locked condition.
Figure 14:
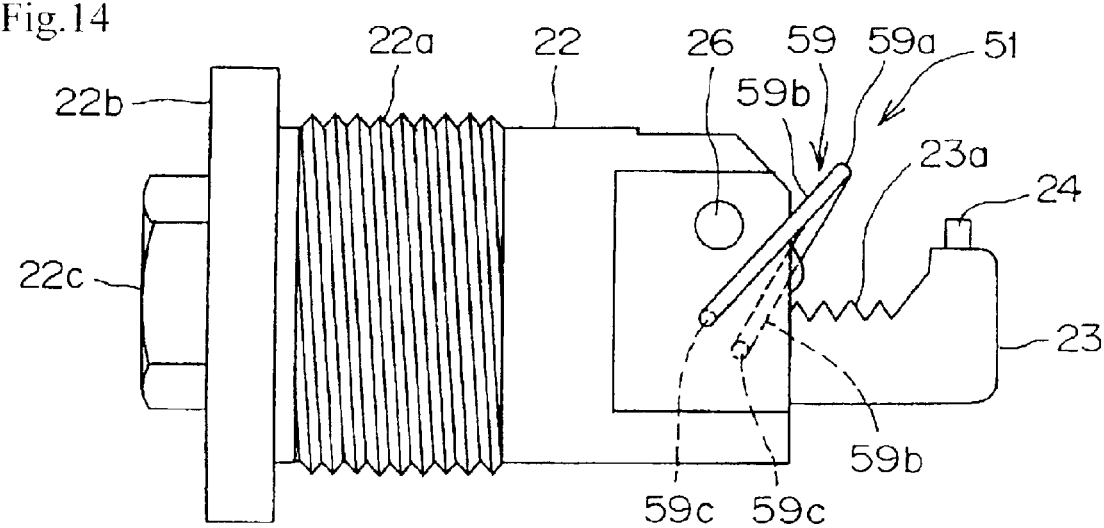
FIG. 14 is a side elevational view of the tensioner of FIG. 13, showing its wire spring in an unlatched condition and its plunger in a protruding condition.
Figure 15:
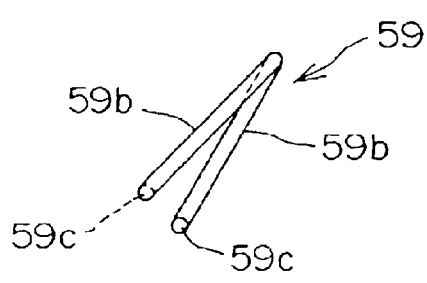
FIG. 15(A) is a side elevational view of the wire spring of FIGS. 13 and 14 in its relaxed condition.
FIG. 15(B) is a front elevational view of the wire spring of FIG. 15(A)
Figure 15:
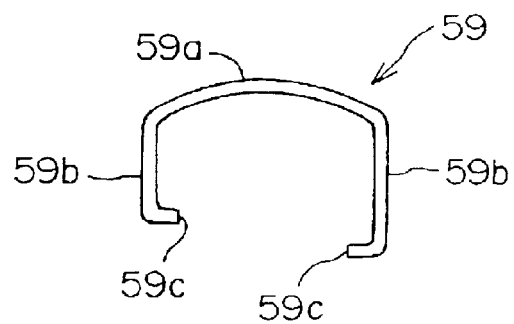

The wire spring 59, used in the tensioner 51 shown in FIGS. 13 and 14, comprises a locking portion 59a, which is engaged with a locking pin 24, as shown in FIG. 13, and two arms 59b, which are continuous with the locking portion 59a, are shown in FIGS. 15(A) and 15(B). In this case, the lengths of the two arms 59b are the same. As in the previously described embodiments, the end 59c of each arm 59b is bent inward. In the relaxed condition of the wire spring 59, the two arms 59b are deformed not so that they are in different planes, as shown in FIG. 15(A). The wire spring 59 is substantially U-shaped as shown in FIG. 15(B).

The wire spring 59 is attached to mounting holes formed on the both side walls of the housing 22 at displaced positions, so that the respective arms 59b are pivotable as shown in FIG. 14. As shown in FIG. 14, the wire spring 59 is attached to the housing 22 in the same relaxed condition as seen in FIG. 15(A). Therefore, the wire spring 59 has no stress in its unlatched condition.

When the wire spring 59 is pivoted clockwise from its unlatched condition shown in FIG. 14 to engage the locking portion 59a with the locking pin 24, as shown in FIG. 13, stress is generated in the wire spring 59. The reason for the generation of the stress is as previously described. Since the pivot centers of the respective arms 59b, that is the positions of the front end portions 59c, are displaced, the paths of the ends of the respective arms that connect to the locking portion 59a are different. Consequently, strain is produced in the locking portion 59a, and stress is generated by the strain.

The installation, operation and effects of tensioner 51 according to the fourth embodiment of the invention are the same as in the case of the tensioner 21 according to the first embodiment.

A tensioner according to a fifth embodiment of the invention will be described with reference to FIGS. 16 to 18(B).

The wire spring 69 comprises a locking portion 69a, which is engageable with a locking pin 26, and two arms 69b which are continuous with the locking portion 69a, as shown in FIGS. 18(A) and 18(B). The lengths of the two arms 69b are different from each other, and the end 69c of each arm 69b is bent inward. When the wire spring 69 is in its relaxed condition, the two arms 69b of the wire spring 69 are in the same plane as shown in FIG. 18(A). The wire spring is substantially U-shaped as shown in FIG. 18(B).

Figure 16:
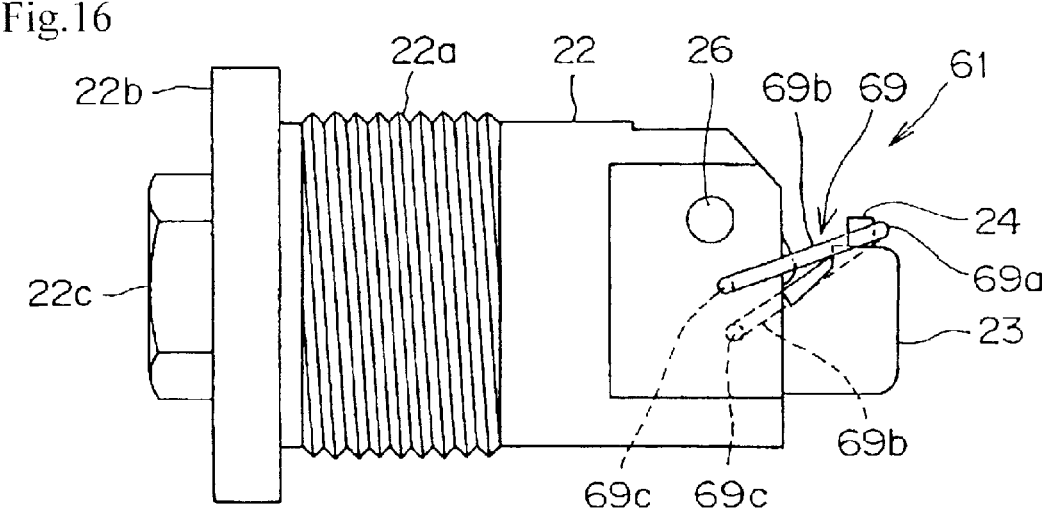
FIG. 16 is a side elevational view of a tensioner according to a fifth embodiment of the invention, with its wire spring in a locked condition.
Figure 17:
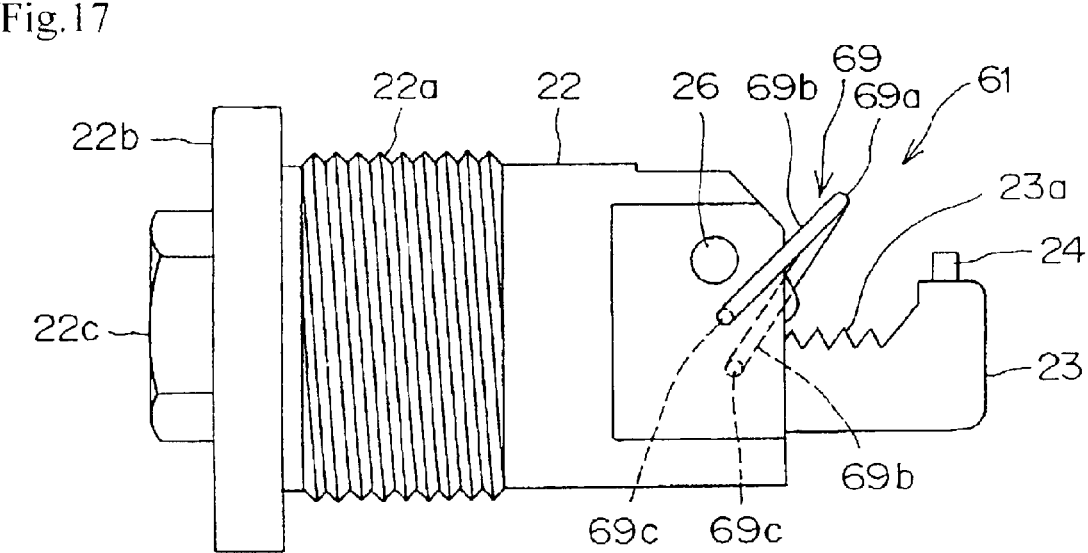
FIG. 17 is a side elevational view of the tensioner of FIG. 16, showing its wire spring in an unlatched condition and its plunger in a protruding condition.
Figure 18:
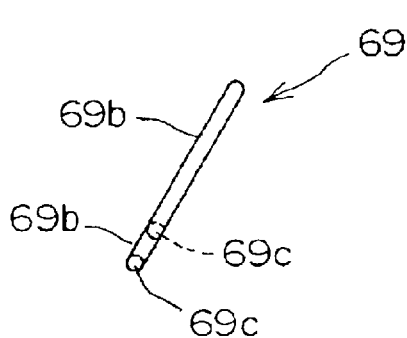
FIG. 18(A) is a side elevational view of the wire spring of FIGS. 15 and 16 in its relaxed condition.
FIG. 18(B) is a front elevational view of the wire spring of FIG. 18(A)
Figure 18:
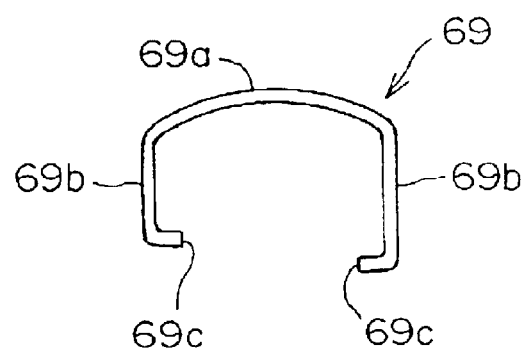

As shown in FIGS. 16 and 17, the wire spring 69 is installed on a tensioner by attaching the ends 69c of its arms to mounting holes formed at displaced positions on opposite side walls of the housing 22, so that the ends 69c are pivotable as shown in FIGS. 16 and 17. The wire spring 39 is attached to the housing 22 in a condition different from its relaxed condition as shown in FIG. 18(A). That is, the wire spring 69 is twisted when it is attached to the housing 22, as shown in FIG. 17, so that the end 69c of the shorter of arms 69b is higher than the corresponding end of the longer arm. Therefore, a slight stress is generated in the wire spring 69 when it is in its unlatched condition as shown in FIG. 17.

When the wire spring 69 is pivoted clockwise from its unlatched condition, shown in FIG. 17, to engage the locking portion 69a onto the locking pin 24, as shown in FIG. 16, further stress is generated in the wire spring 69. Further stress is generated because the pivot centers of the respective arms 69b are displaced so that the pivoting paths of the parts of the arms 69b that are connected to the locking portion 69a of the wire spring are different from each other. As the wire spring is pivoted clockwise, strain is produced in the locking portion 69a and the further stress is generated by the strain. The stress of the wire spring 69 when in its latched condition as in FIG. 16, is larger than the stress in the wire spring when in its unlatched condition as shown in FIG. 17.

The installation, operation and effects of the tensioner 61 according to the fifth embodiment of the invention are the same as in the case of the tensioner 21 according to the first embodiment, except that the wire spring is twisted before it is attached to the tensioner body.

A tensioner 71, according to a sixth embodiment of the invention, will be described with reference to FIGS. 19 to 21(B).

The wire spring 79 used in the tensioner 71 comprises a locking portion 79a, which is engageable with a locking pin 26, and two arms 79b are continuous with the locking portion 79a, as shown in FIGS. 21(A) and 21(B). The lengths of the two arms 79b are the same, and the end 79c of each arm 79b is bent inward. When the wire spring is in its relaxed condition, as shown in FIG. 21(A) the two arms 79b are in the same plane. The wire spring 79 is substantially U-shaped, as shown in FIG. 21(B).

Figure 20:
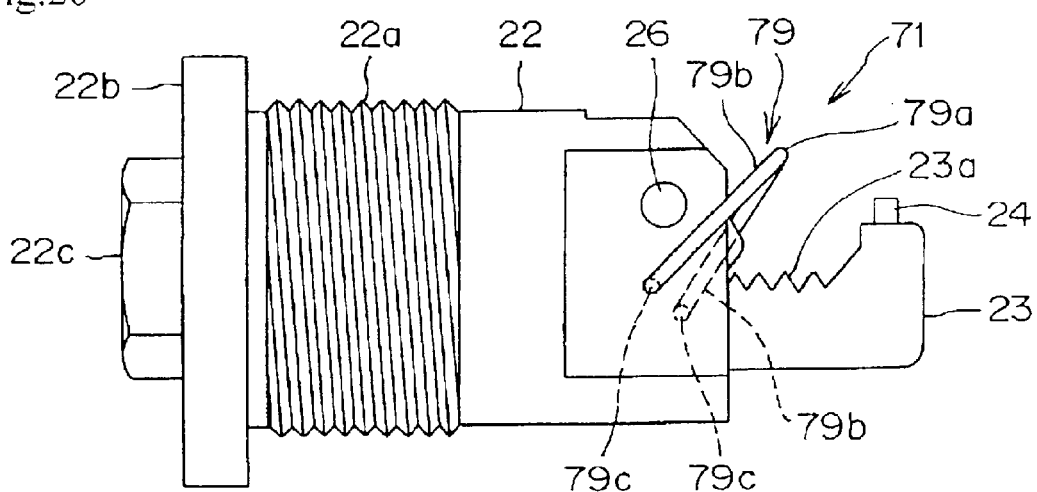
FIG. 20 is a side elevational view of the tensioner of FIG. 16, showing its wire spring in an unlatched condition and its plunger in a protruding condition.
Figure 21:
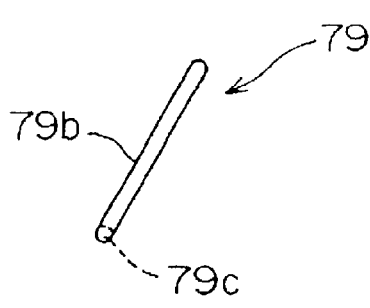
FIG. 21(A) is a side elevational view of the wire spring of FIGS. 19 and 20 in its relaxed condition.
FIG. 21(B) is a front elevational view of the wire spring of FIG. 21(A)
Figure 21:
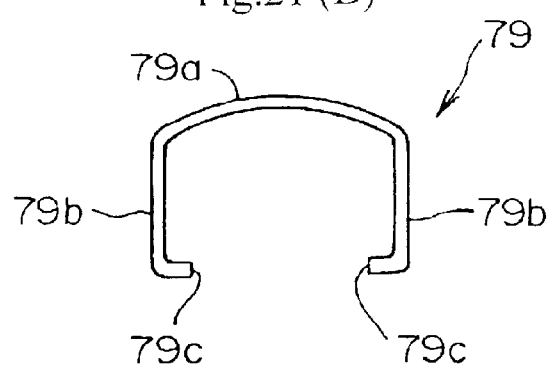

The wire spring 79 is attached to mounting holes formed on opposite side walls of the housing 22 at displaced positions. The end portions 79c of the respective arms 79b are pivotable as shown in FIG. 20. The wire spring 79 is attached to the housing 22 in a different condition from the relaxed condition shown in FIG. 21(A). That is, the wire spring 79 is slightly twisted before it is attached to the housing 22, so that arm 79b is higher than the other arm 79b, as shown in FIG. 20. Therefore, a slight stress is generated in the wire spring 79 when in its unlatched condition.

Figure 19:
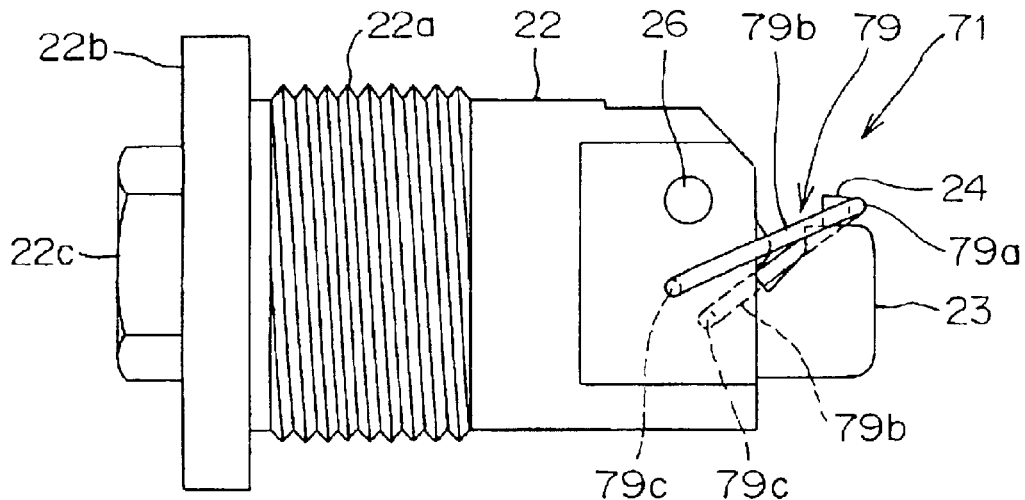
FIG. 19 is a side elevational view of a tensioner according to a sixth embodiment of the invention, with its wire spring in a locked condition.

When the wire spring 79 is pivoted clockwise from its unlatched condition shown in FIG. 20, to engage the locking portion 79a onto the locking pin 24, as shown in FIG. 19, further stress is generated in the wire spring 79. Further stress is generated because the pivot centers of the respective arms 79b are displaced so that the pivoting paths of the parts of the arms 79b that are connected to the locking portion 79a of the wire spring are different from each other. As the wire spring is pivoted clockwise, strain is produced in the locking portion 79a and the further stress is generated by the strain. The stress of the wire spring 79, when in its latched condition as in FIG. 19, is larger than the stress in the wire spring when in its unlatched condition as shown in FIG. 20.

The installation, operation and effects of the tensioner 71 according to the sixth embodiment of the invention are the same as in the case of the tensioner 61 according to the fifth embodiment.

Figure 22:
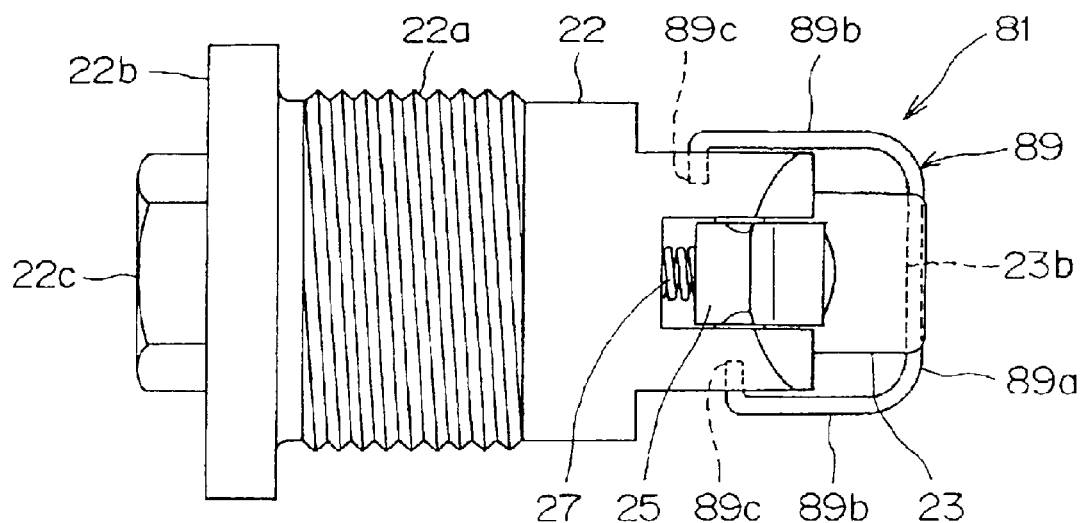
FIG. 22 is a top plan view of a tensioner according to a seventh embodiment of the invention, with its wire spring in a locked condition.
Figure 23:
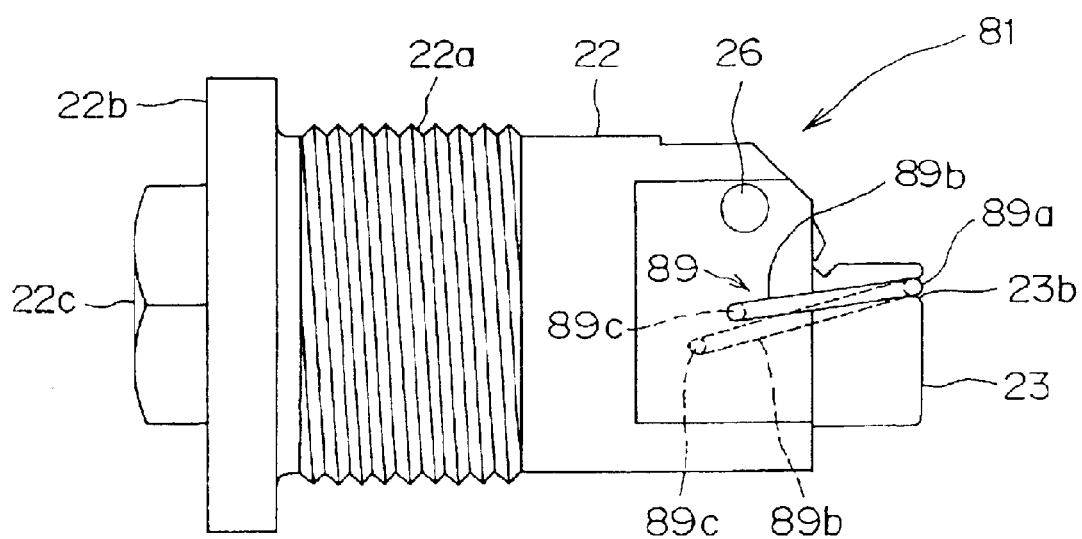
FIG. 23 is a side elevational view of the tensioner of FIG. 22.

A tensioner according 81 to a seventh embodiment of the invention is shown in FIGS. 22 and 23. Instead of a locking pin, the front of the plunger 23 of tensioner 81 is provided with a locking groove 23b, engageable by a locking portion 89a of a wire spring 89. The wire spring 89 is substantially the same as the wire spring in tensioner 21 according to the first embodiment of the invention shown in FIGS. 1–6(B). Other elements of tensioner 81 are the same as those of the tensioner 21 and are denoted by the same reference numbers.

The installation, operation and effects of the tensioner 81 according to the seventh embodiment of the invention are the same as in the case of the tensioner 21 according to the first embodiment.

Figure 24:
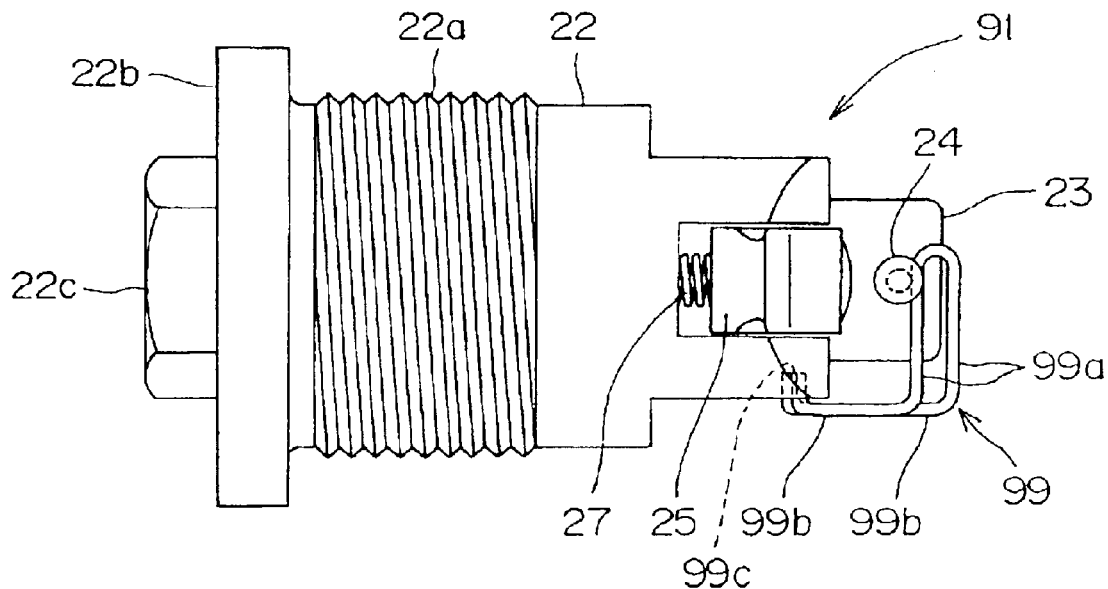
FIG. 24 is a top plan view of a tensioner according to an eighth embodiment of the invention, with its wire spring in a locked condition.
Figure 25:
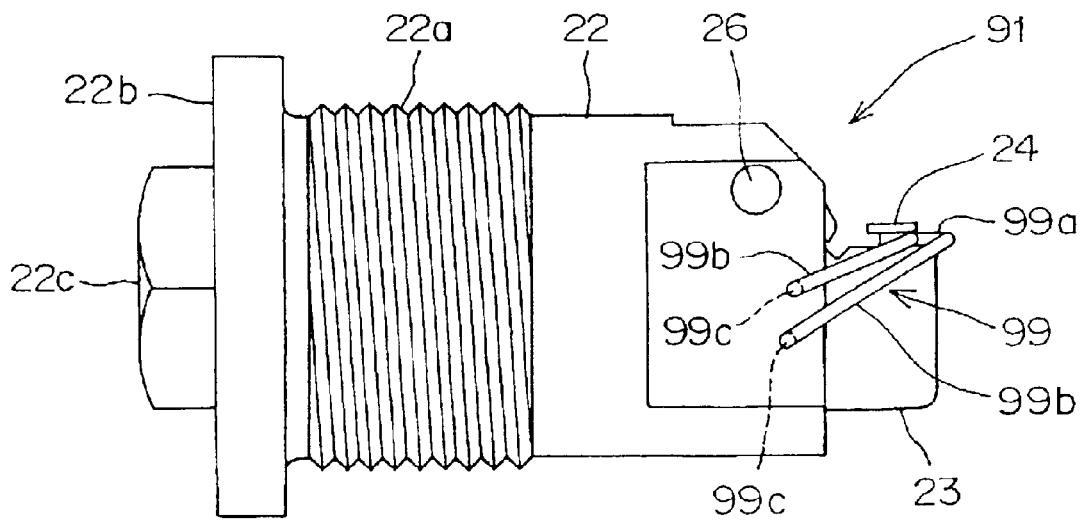
FIG. 25 is a side elevational view of the tensioner of FIG. 24.

A tensioner 91 according to an eighth embodiment of the invention is shown in FIGS. 24 and 25.

As shown in FIG. 24, a wire spring 99 comprises a U-shaped locking portion 99a, which is engaged with a locking pin 24. The wire spring also comprises two arms 99b, which are continuous with the locking portion 99a, as shown in FIG. 25. The lengths of the two arms 99b are different from each other, and the end 99c of each arm 99b is bent inward. Unlike the U-shaped wire springs in the previously described embodiments, in the eighth embodiment, the wire spring 99 is substantially L-shaped, as seen in FIG. 24.

The wire spring 99 is attached to mounting holes formed on one side wall of the housing 22 at displaced locations. The end portions 99c of the respective arms 99b are pivotable as shown in FIG. 25. Stress is generated in the wire spring when in its latched condition on locking pin 24 (the condition shown in FIGS. 24 and 25). When the wire spring is unlatched, it pivots counterclockwise until it is in an unstressed condition.

The installation operation of the tensioner 91 is carried out by attaching the wire spring to one side wall of the tensioner body, and pivoting it to a position in which it engages the locking pin 24 to hold the plunger in its retracted condition. The operation and effects of the tensioner, however, are the same as in the case of tensioner 21 according to the first embodiment of the invention.

As an alternative, as in the case of the seventh embodiment, the locking portion 91a of the wire spring 91 can be engaged with a groove formed in the plunger instead of being engaged with a locking pin.

The beneficial effects exhibited by the tensioners of the various embodiments described above may be summarized as follows.

First, the stress in the wire spring itself provides the force causing it to move in the unlatching direction when it is released by inward movement of the plunger. Consequently, operation of the latching device is gravity-independent, and the plunger is unlocked automatically without regard to its attitude when installed.

Unlike the conventional tensioner shown in FIGS. 30 and 31, where a hook is unlatched by a coiled torsion spring, in the tensioner according to the invention, since the wire spring itself provides the unlatching force, no coiled torsion spring is required. Thus, the number of parts is decreased, and incorporation of the tensioner into an engine is facilitated.

Since the wire spring can be attached to the housing without a supporting shaft, the press-fitting operation required in the case of a supporting shaft is obviated, and here again the number of parts is reduced, and assembly is simplified.

We claim:

1. A tensioner comprising a housing, a plunger protruding from the housing, the plunger being movable between a retracted position and a protruding condition and biased in the protruding direction, and a locking member, wherein said locking member comprises a wire spring comprising a locking portion engageable with said plunger when said plunger is in said retracted position for temporarily maintaining said plunger in said retracted position, and two arms extending from said locking portion, the respective arms having front ends pivotally attached to said housing whereby said wire spring is pivotable on the housing from a position in which said locking portion is engaged with the plunger to a position in which said locking portion is disengaged from said plunger, said front ends of the arms being pivoted on axes laterally displaced with respect to each other in a direction such that a stress is generated in said wire spring when the locking portion thereof is engaged with the plunger, said stress resiliently urging the wire spring in a direction to disengage said locking portion from said plunger.

2. A tensioner according to claim 1, in which the stress in said wire spring when said locking portion is engaged with said plunger is larger than the stress in said wire spring when said locking portion is disengaged from said plunger.

3. A tensioner according to claim 2, in which said spring is substantially U-shaped.

4. A tensioner according to claim 2, in which said spring is substantially L-shaped.

5. A tensioner according to claim 1, in which said plunger is movable in a retracting direction from said retracted position, and in which said locking portion of the wire spring is engageable with a detent on said plunger, said detent has an engagement surface positioned to hold said locking portion in engagement with said plunger when the plunger is in said retracted position, and to allow the locking portion to clear the detent when said plunger is moved farther in a retracting direction from said retracted position, thereby allowing the stress in said wire spring to cause the locking portion to clear said detent.

6. A tensioner according to claim 5, in which said spring is substantially U-shaped.

7. A tensioner according to claim 5, in which said spring is substantially L-shaped.

8. A tensioner according to claim 5, in which said detent is a locking pin provided on said plunger.

9. A tensioner according to claim 8, in which said spring is substantially U-shaped.

10. A tensioner according to claim 8, in which said spring is substantially L-shaped.

11. A tensioner according to claim 5, in which said detent is a locking groove provided on said plunger.

12. A tensioner according to claim 11, in which said spring is substantially U-shaped.

13. A tensioner according to claim 11, in which said spring is substantially L-shaped.

14. A tensioner according to claim 1, in which said spring is substantially U-shaped.

15. A tensioner according to claim 1, in which said spring is substantially L-shaped.

* * * * *